(12) United States Patent
Clark

(10) Patent No.: US 7,017,845 B2
(45) Date of Patent: Mar. 28, 2006

(54) DRAG MATERIAL AND APPARATUS FOR FISHING REELS

(75) Inventor: Chad Clark, Arnold, MD (US)

(73) Assignee: Penn Fishing Tackel Manufacturing Co., Philadelphia, PA (US)

( * ) Notice: Subject to any disclaimer, the term of this patent is extended or adjusted under 35 U.S.C. 154(b) by 33 days.

(21) Appl. No.: 10/856,607

(22) Filed: May 28, 2004

(65) Prior Publication Data

US 2005/0274837 A1 Dec. 15, 2005

(51) Int. Cl.
*A01K 89/01* (2006.01)

(52) U.S. Cl. .................. 242/244; 242/246; 242/321; 188/251 R; 188/251 A

(58) Field of Classification Search ............ 242/244, 242/246, 321; 188/251 R, 251 A
See application file for complete search history.

(56) References Cited

U.S. PATENT DOCUMENTS

| 3,254,861 | A | * | 6/1966 | Jahn | 242/318 |
| 3,682,411 | A | * | 8/1972 | Dumbauld | 242/246 |
| 4,488,689 | A | * | 12/1984 | Councilman | 242/245 |
| 4,549,702 | A | * | 10/1985 | Councilman | 242/246 |
| 4,664,330 | A | * | 5/1987 | Darden | 242/244 |
| 4,728,054 | A | * | 3/1988 | Pisapio | 242/258 |
| 5,118,048 | A | * | 6/1992 | Childre et al. | 242/245 |
| 5,895,716 | A | * | 4/1999 | Fiala et al. | 428/408 |
| 6,318,655 | B1 | * | 11/2001 | Henze | 242/244 |
| 6,467,591 | B1 | * | 10/2002 | Ohara | 188/251 A |
| 6,586,373 | B1 | * | 7/2003 | Suzuki et al. | 508/101 |
| 6,626,386 | B1 | * | 9/2003 | Stiner et al. | 242/285 |
| 6,811,820 | B1 | * | 11/2004 | Locker et al. | 427/350 |

FOREIGN PATENT DOCUMENTS

JP  2000-004739 A  *  1/2000

* cited by examiner

*Primary Examiner*—Kathy Matecki
*Assistant Examiner*—Evan Langdon
(74) *Attorney, Agent, or Firm*—Frank J. Benasutti

(57) ABSTRACT

A drag mechanism in a fishing reel has a friction material impregnated with a phenolic resin before it is laminated to a drag plate. The material is 30% phenolic coated 99+% carbon fabric.

10 Claims, 2 Drawing Sheets

DRAG MATERIAL AND APPARATUS FOR FISHING REELS

BACKGROUND OF THE INVENTION

1. Field of the Invention

This invention relates to drag mechanisms for fishing reels and, more particularly, to a drag material and a method of utilizing it on drag washers and plates.

2. Description of the Prior Art

The prior art teaches fishing reels having drag washers. In a conventional reel, the drag works as a clutch between the main gear and the gear stud. The drag setting will determine the torque needed to rotate the main gear relative to the gear stud.

These mechanisms all exhibit a slipping characteristic; that is, the prior art mechanisms stuck and then slipped when the drag was used. Often the material would break down after repeated use, and become less effective It is desirable to increase the performance of drag mechanisms. Accordingly, it is an object of this invention to improve upon the drag produced by that mechanism and greatly improve the effectiveness of the drag apparatus.

This and other objects of the invention will become apparent from the following description with reference to the accompanying drawings.

SUMMARY OF THE INVENTION

My improved drag material comprises a phenolic coated carbon fabric. In one embodiment, it is assembled with a drag plate by a new method to produce a more effective drag apparatus.

DESCRIPTION OF THE PREFERRED EMBODIMENTS OF THE INVENTION

Figure 1:
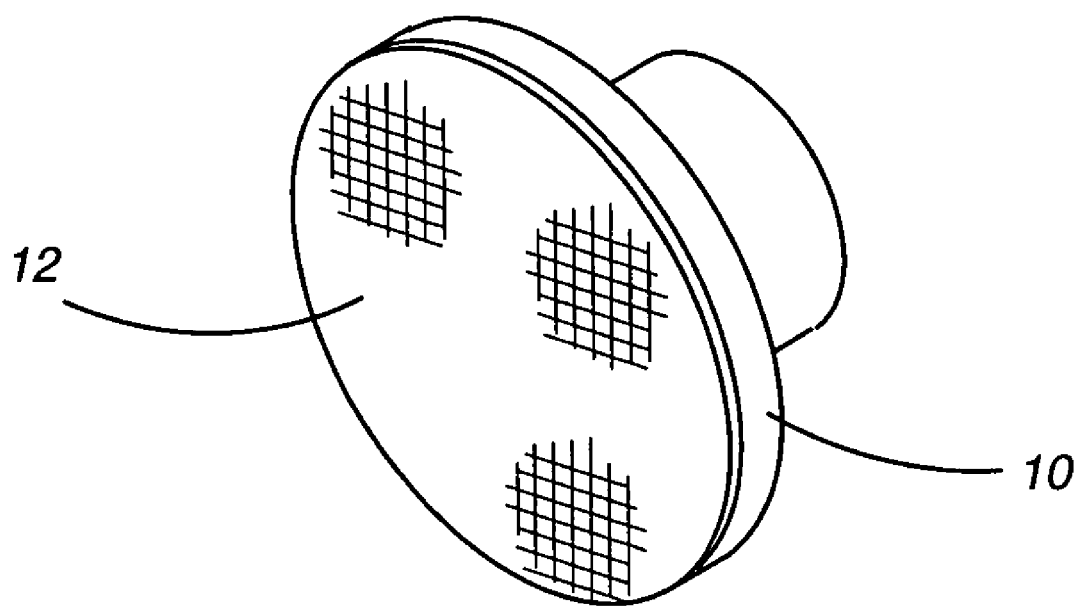
FIG. 1 shows a perspective view of a drag plate assembly for use in a fishing reel.

The main use of the preferred embodiment of my invention is to provide a clutch between a main gear and a gear stud in a fishing reel. In FIG. 1, a drag plate 10 is shown with my new drag material 12 mounted on the surface.

Figure 2:
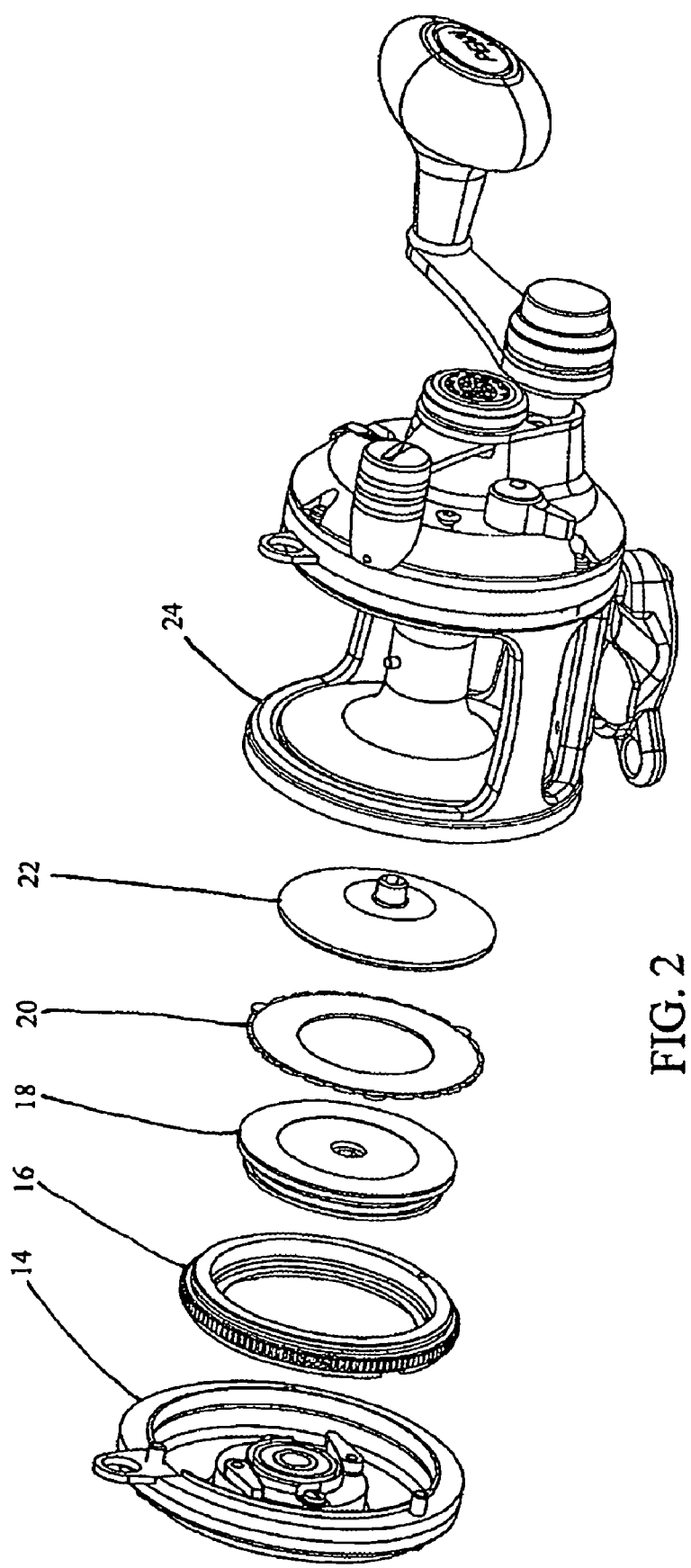
FIG. 2 shows a perspective view of a drag plate assembly in a fishing reel.

FIG. 2 shows an exploded perspective view of a fishing reel having a left side plate 14, a drag cover 16, an outer drive plate assembly 18, a metal drag washer 20, an inner drag plate assembly 22 and a frame and handle 24.

In the prior art the drag material was most preferably a composite material having a center laminated portion comprised of fiberglass with a binder resin such as epoxy and outer laminated graphite (carbon) portions forming the entire radial friction surfaces. The fiber composition was three layers of epoxy impregnated glass fibers, which were sandwiched between layers of woven graphite cloth. The laid-up drag material was compressed and cured to produce the drag material. The final thickness was 0.050 inches, plus or minus 0.005 inches, and had a high co-efficient of friction; most preferably 0.14.

The drag material was assembled with the drag plate by placing a laminate between the two and pressing them together and then baking them.

As a result of this material and method of assembly, after 30 hours of use, the material became flattened and began to shine. It also had uneven wear patterns.

The old material of which I am aware had the following characteristics:
Fabric—plain construction
27×27 count (warp/fill)+/−4
Aerial weight (oz/sq. yd) 6.5+/−1
Thickness (mils) 28+/−8
Width (inches) 42
Epoxy composite
Flexural strength (ksi) 38
Flexural modulus (msi) 6
Interlaminar (ksi) 4.5
Density (gm/cc) 1.56
Fiber volume (%) 55
Cured-ply thickness (mils) 9
My new material has the following characteristics:
Fabric
   Weave construction—plain
   Weave count—warp (per cm) 9–10.6
     fill (per cm) 7.1–7.9
   Base weight (gm/sq. m) 270–300
   Thickness (microns) 675–825
   Width (cm) 117
   Filament properties
     ø: 7.5 microns
     Density—1.75–1.77 gm/cc
     Tensile strength 192.5 kN/cm2
     Tensile modulus 26.6 mN/cm2
     Carbon content 99.5%

The most preferred drag material is comprised of a 30% phenolic coated 99+% carbon fabric.

A plain weave is one in which the threads interlace alternately in the woven cloth. The weave count refers to the number of crossovers of warps and fill in a given area measured, for example, in cubic square centimeters.

The warp is the series of yarns extending lengthwise in the woven fabric. These warp yearns are crossed by the fill yearns to make the woven fabric.

The base weight is measured in grams per square meter.

The thickness of the fabric is measured in microns, that is millionths of a meter.

The filaments are single threads.

The symbol ø refers to the diameter of the filament and is measured in microns.

The density of the filament is measured in grams per cubic centimeter.

The tensile strength is measured in kN that is, thousands of newtons per square centimeter. N=0.225 pounds of force.

The tensile modulus is measured in mN, that is millinewtons per square centimeter.

The carbon content refers to the conditions under which the fiber is to be heated. For example, for a higher carbon content, such as 99.5%, the conditions are much higher than, say, 92–95% carbon content. As is known in the prior art, woven fabric can be baked in a furnace to bring the carbon content to a level in excess of 99%.

The resulting product is then saturated with a phenolic resin mixture.

Phenolic is a thermosetting resin.

The fibers in the fabric absorb the phenolic mixture and, after the material is cured, 30% of the material is phenolic resin and 70% is carbon fiber.

Preferred method of assembly

The drag material 12 with the resin already in it and adhesive on one side, is cut to size and then bonded onto the drag plate 10.

Thereafter, grease may be applied to the drag surface in any suitable manner (well known in the art) to increase its performance.

This mechanism dramatically increases the drag in this type of device.

What is claimed is:

1. A fishing reel having a drag mechanism using a friction imparting material, said material having the following characteristics:
   a) a plain weave-construction having a weave count of filaments, wherein the weave count of a warp is substantially in the range of 9–10.6 per centimeter and the weave count of a fill is substantially in the range of 7.1–7.9 per centimeter;
   the base weight is substantially in the range of 270–300 grams per square meter;
   the thickness is substantially in the range of 675–825 microns;
   and the filament properties are:
      diameter 7.5 microns;
      density substantially in the range of 1.75–1.77 grams per cubic centimeter;
      tensile strength 192.5 thousands of newtons per square centimeter;
      tensile modulus 26.6 millinewtons per square centimeter; and
      the carbon content of the material is at least 99%.

2. The fishing reel of claim 1 wherein the friction imparting material is laminated to a drag plate.

3. The fishing reel of claim 1 wherein the friction imparting material is treated to be 30% phenolic resin.

4. The fishing reel of claim 1 wherein the friction imparting material is laminated to a drag plate and is subsequently greased.

5. The fishing reel of claim 1 wherein the friction imparting material is 99.5% carbon.

6. A friction imparting material for use in a fishing reel, said material having the following characteristics:
   a) a plain weave-construction having a weave count of filaments, wherein the weave count of a warp is substantially in the range of 9–10.6 per centimeter and the weave count of a fill is substantially in the range of 7.1–7.9 centimeter;
   the base weight is substantially in the range of 270–300 grams per square meter;
   the thickness is substantially in the range of 675–825 microns;
   and the filament properties are:
      diameter 7.5 microns;
      density substantially in the range of 1.75–1.77 grams per cubic centimeter;
      tensile strength 192.5 thousands of newtons per square centimeter;
      tensile modulus 26.6 millinewtons per square centimeter; and
      the carbon content of the material is at least 99%.

7. The material of claim 6 wherein the friction imparting material is laminated to a drag plate.

8. The material of claim 6 wherein the friction imparting material is treated to be 30 phenolic resin.

9. The material of claim 6 wherein the friction imparting material is laminated to a drag plate and is subsequently greased.

10. The material of claim 6 wherein the friction imparting material is 99.5% carbon.

* * * * *